United States Patent Office 3,523,728
Patented Aug. 11, 1970

3,523,728
COLOR PRINTING APPARATUS
Richard Wick, Grunwald, near Munich, and Walter Knapp, Munich, Germany, assignors to AGFA-Gevaert Aktiengesellschaft, Leverkusen, Germany
Filed Apr. 13, 1967, Ser. No. 630,587
Claims priority, application Germany, Apr. 20, 1966,
A 52,208
Int. Cl. G03b 27/76
U.S. Cl. 355—32
20 Claims

ABSTRACT OF THE DISCLOSURE

The density of color prints on multiple sensitized photographic material is controlled as a function of the reading of a relatively small central portion of the negative, and the color balance of the print is controlled as a function of the tonal distribution in a relatively large portion of the negative. Both readings are carried out by resorting to photoelectric means, and the means which reads the central portion (containing the most important part of the image) regulates the sensitivity of photoelectric means which measure the tonal distribution of the larger portion of the negative. Such larger portion can include the entire negative or all but the small central portion of the negative.

BACKGROUND OF THE INVENTION

The present invention relates to a method and apparatus for color printing of images on multiple sensitized photographic material. More particularly, the invention relates to improvements in a method and apparatus for color printing wherein a composite light beam containing a plurality of light components of different wave lengths (the primary colors red, blue and green) is caused to pass through a negative and is focussed onto multiple sensitized photographic material to form thereon a projected image.

Presently known automatic photographic printers for multiple sensitized photographic material operate with integral light measurement and control the exposure times on the basis of the neutral grey principle. Depending on the requirements regarding the quality and depending on the nature of negatives, one can obtain between 60 and 80 percent of satisfactory prints without necessitating a preliminary examination of negatives by an expert technician. The production of prints from remaining negatives requires correction of density and/or color balance. For example, density control is necessary when the density of the most important part of the negative deviates considerably from the density of the remainder of the negative. Corrections in color balance are needed if a certain color prevails so that the ratio of the densities of the three primary colors deviates considerably from the neutral grey value. It is well known that a certain color often prevails in the most important part of the negative.

It is an object of our invention to provide a method of color printing from negatives in such a way that the percentage of automatically produced satisfactory prints is increased without necessitating an examination of prints by expert technicians.

Another object of the invention is to provide a novel method of color printing on multiple sensitized photographic paper according to which the density of the print is determined by the density of the most important part of the negative.

A further object of the invention is to provide an improved apparatus which may be utilized in practicing the above outlined method.

An additional object of the invention is to provide a novel electric circuit for use in the improved apparatus.

SUMMARY OF THE INVENTION

One feature of our invention resides in the provision of a method of color printing of images on multiple sensitized photographic material. The method comprises directing a composite light beam containing a plurality of light components (the three primary colors) of different wave length through a negative and focussing the composite beam on photographic material to form thereon a projected image, reading a first light sample which has passed through a relatively small first portion of the negative to determine the density of the print on photographic material as a function of the thus determined density, reading a second light sample which has passed through a relatively large second portion of the negative to determine the tonal distribution of the second portion, and controlling the color balance of the print as a function of the thus determined tonal distribution.

The first portion is preferably the central portion of the negative which, in most instances, encompasses the most important part of the image. The second portion may include all but the first portion of the negative or the entire negative.

The reading of the light samples is carried out by photoelectric means, and the step of controlling the density of the print includes regulating the sensitivity of the photoelectric means which read the second light sample as a function of the density of the first portion of the negative.

The novel features which are considered as characteristic of the invention are set forth in particular in the appended claims. The improved color printing apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
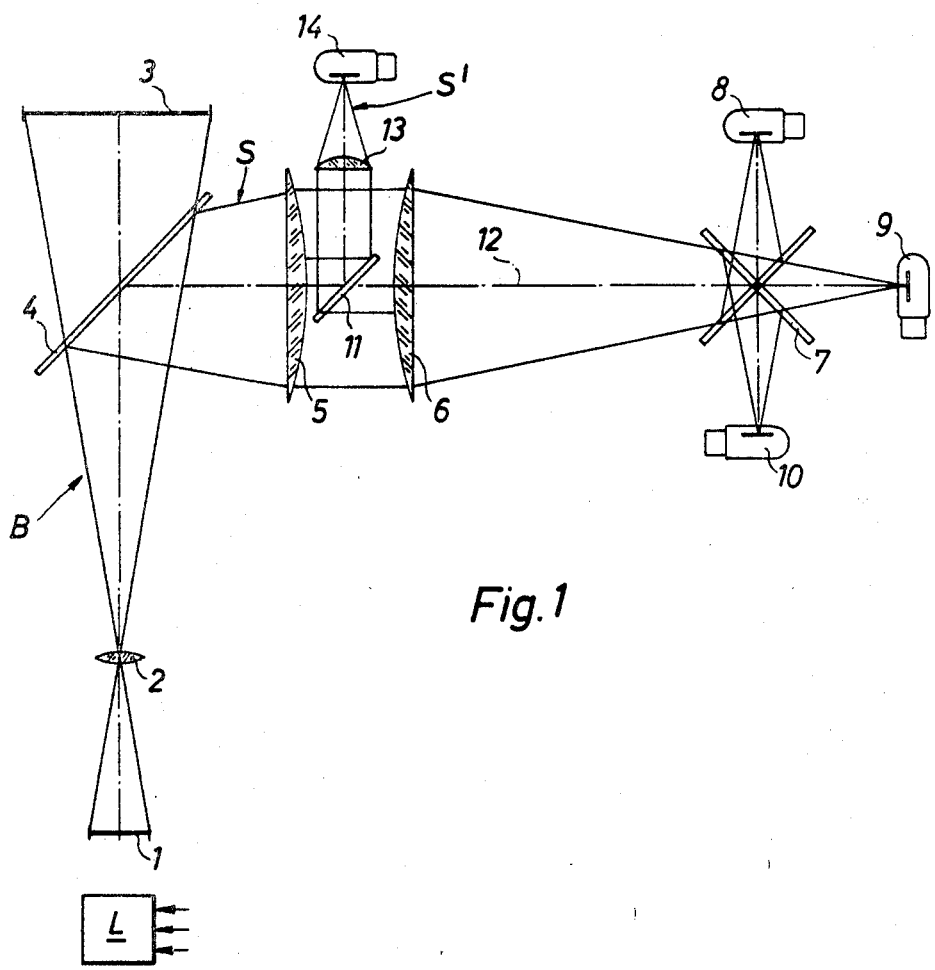
FIG. 1 is a schematic side elevational view of an automatic printing apparatus which embodies our invention.

Referring first to FIG. 1, there is shown a negative 1 whose enlarged image is projected by an objective lens system 2 onto a sheet 3 of multiple sensitized photographic material located in a positive plane. The sources of green, red and blue light are installed in a unit L, and the three light components of different wave length form a composite light beam B. A partially light-transmissive deflecting mirror 4 is located in the path of the composite light beam B to deflect a sample S (for example, about 30 percent) of light which has passed through the objective lens system 2. The sample S is caused to pass through lenses 5 and 6 constituting a condenser lens system which focusses the light on a dichroic beam splitter 7 serving to direct the three primary colors against three photoelectric reading means constituted by secondary emission multipliers 7, 8 and 9. These emission multipliers read the tonal distribution of the major portion of the negative 1 and determine the color balance of the print. The unit L as well as the means for determining the color of the printing light may be formed for example as shown in applicants U.S. Pat. 3,127,267, FIG. 3.

The space between the condenser lenses 5 and 6 accommodates a second deflecting mirror 11 which is located in a plane making an angle of 45 degrees with the optical axis 12 of the condenser lens system and directs a second samle S' toward a condenser lens 13 which focusses it on a photoelectric element 14 serving to read the density of the most important central part of the negative 1.

The element 14 may be constituted by a cadmium sulphide cell. Depending on the type of available electrical energy, the cell 14 may be replaced by a photoelectric resistor, by a high vacuum cell or by a secondary emission multiplier. The mirror 11 deflects from the sample beam S a relatively small sample S' which has passed through the central portion of the negative 1, it being normally warranted to assume that the central portion of the negative contains the most important part of the image. The area of the mirror 11 may be between 10 and 35 percent of the area of the color print on the photographic material 3.

The holders for the negative 1, photographic material 3 and optical elements 2, 4, 5, 6, 7, 11, 13 were omitted for the sake of clarity.

Figure 2:
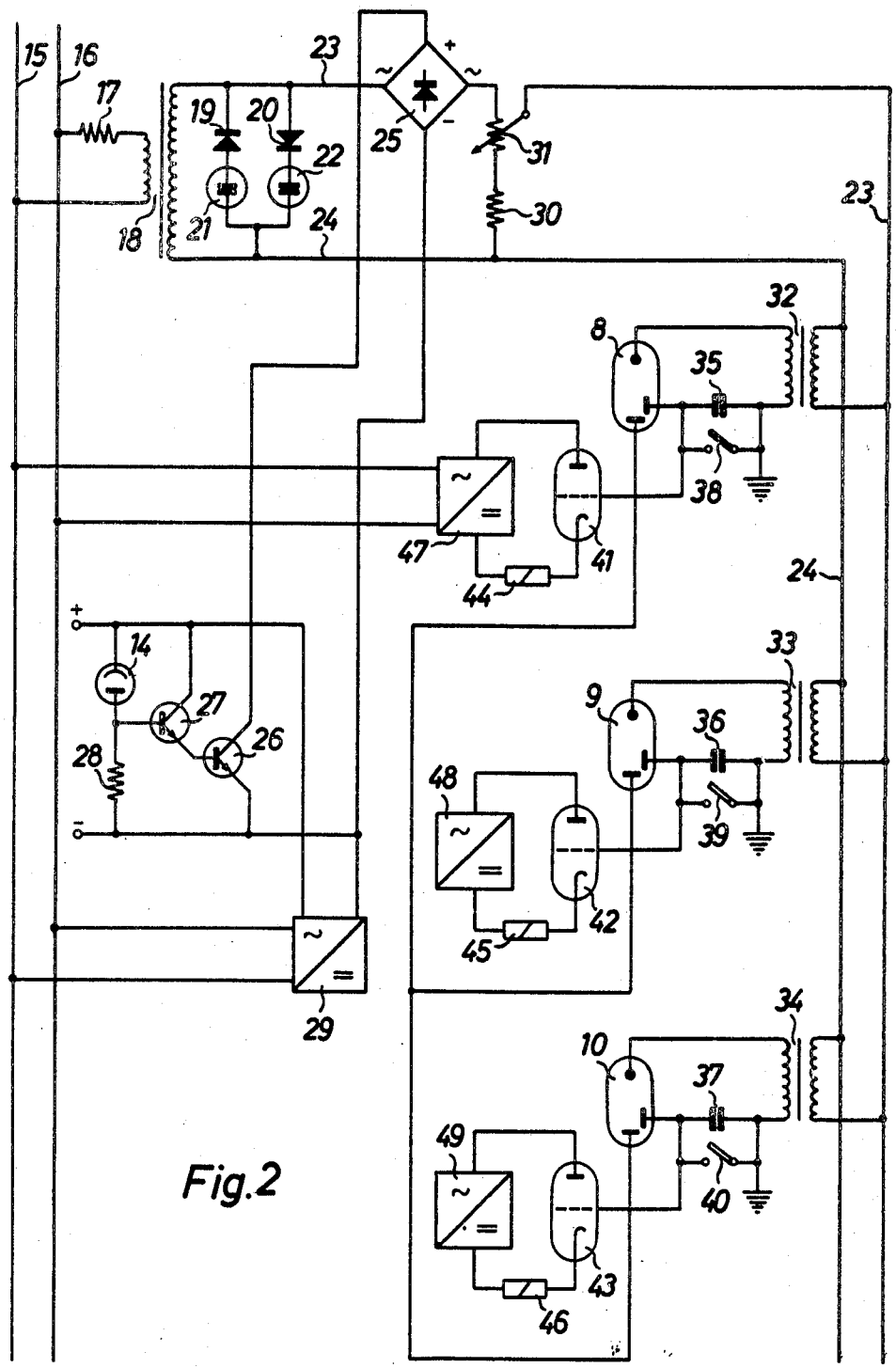
FIG. 2 is a diagram showing the electric circuit of the printing apparatus.

The electric circuit of the improved printing apparatus is shown in FIG. 2. Two power leads 15, 16 are connected to the terminals of a source of alternating current (220 volts). These power leads are connected with the primary winding of a transformer 18 in series with a resistor 17. Rectifiers 19, 20 and glow tubes 21, 22 are provided to produce in the circuit of the secondary winding of transformer 18 a voltage of desired pulse shape. The ends of the secondary winding are connected with conductors 23, 24 the former of which contains a bridge rectifier 25. The direct-current branch of the bridge rectifier 25 is connected with the emitter-collector circuit of a transistor 26. The base of the transistor 26 is connected with the emitter of an amplifier transistor 27, and the base of the amplifier transistor 27 is connected with a tap between the aforementioned cell 14 and a resistor 28. The components 14, 28 constitute a voltage divider which is connected to a source 29 of direct current. A further voltage divider including a fixed resistor 30 and a potentiometer 31 is connected between the conductors 23, 24. This second voltage divider constitutes an overriding control and allows for manual correction of density.

The primary windings of three transformers 32, 33, 34 are connected between the conductor 24 and the slider of the potentiometer 31. These transformers 32–34 supply voltage to the secondary emission multipliers 8, 9, 10. Capacitors 35, 36, 37 are connected between the dynodes of the multipliers 8, 9, 10 and the secondary windings of the transformers 32, 33, 34, and such capacitors can be bypassed by switches 38, 39, 40. Each of the capacitors 35–37 is grounded on the transformer side. On the dynode side, the capacitors 35–37 are connected with the grids of switching tubes 41, 42, 43 which connect electromagnets 44, 45, 46 with power supplies 47, 48, 49. Energization of electromagnets 44–46 will terminate illumination in the respective color, for example, by closing of a shutter or by placing of a filter across the path of light rays in a manner well known from the art. The manner in which the electromagnets 44–46 can actuate shutters or displace filters is not shown in the drawings. Such shutters or filters are accommodated in the unit L of FIG. 1. The parts 41–44–47, 42–45–48 and 43–46–49 constitute three timer circuits which determine the length of the basic exposure in accordance with the density of the central portion and in accordance with the color balance of the remaining portion of the negative 1. These timer circuits can procure an infinite number of exposure time increments.

The operation is as follows:

The mirror 4 will deflect a portion of all such light which has passed through the negative 1 and objective 2. The thus deflected sample S passes through the condenser lens 5. In the space between the lenses 5 and 6, the image is similar to that in the positive plane because the optical distances are the same. That portion of light which has passed through the central portion of the negative 1 and has been deflected by the mirror 4 is deflected by the mirror 11 and the sample S' passes through the condenser lens 13 to impinge upon the cell 14. If the intensity of light reaching the cell 14 is high, the transistor 26 becomes highly conductive and the resistance of the bridge rectifier 25 is low. This rectifier acts as a variable series resistance. The voltage at the dynodes of the secondary emission multipliers 8–10 will be high and the switching times will be short, i.e., the amounts of light emitted up to the moment of switching off will be lower than the amounts needed to insure an average density of prints.

If the intensity of light reaching the cell 14 is low, i.e., if the central region of the negative permits passage of less light, the amplifier transistor 27 conducts less current to the transistor 26. The latter then acts as a high series resistor for the voltage divider 30, 31. The sensitivity of secondary emission multipliers 8, 9, 10 is reduced and the switching times will be longer. The transistor 26 can be said to constitute a controlled resistor in the direct-current branch of the bridge rectifier 25. This is necessary because the dynodes of the multipliers 8–10 are connected with sources of alternating current. Due to such construction of the circuit, the transistor 26 conducts current in one direction only but the current can flow in two directions between the alternating-current terminals of the bridge rectifier 25. The transistor 27 merely acts as an amplifier without phase reversal. This latter transistor can be replaced by a vacuum tube or a multi-stage transistor amplifier.

It is preferable to select the controlled resistor or transistor 26 in such a way that it will have a long time constant characteristic. This insures that the change in dynode potential remains constant all the way to termination of the longest partial illumination. The long time constant can also be associated with the amplifier stage including the transistor 27.

It will be seen that the cell 14 influences the sensitivity of secondary emission multipliers 8–10 as a function of the density of a relatively small portion of the negative 1, namely, the central portion which normally encompasses the most important part of the image. This is of advantage because one primary color is often predominant in the central portion of a high-quality negative and, therefore, by eliminating such central portion from consideration in determining the color balance of the print, the one primary color will prevail in the central portion of the print. However, and if it should become necessary or advisable to correct the color balance in response to reading of an entire negative, the mirror 11 may be replaced by a partially transmissive light deflecting element which is surrounded by a grey filter whose density corresponds to the reflection. In a thus modified printing apparatus, each portion of the negative contributes to the controlling action of secondary electron multipliers 8, 9 and 10. It is further clear that the primary windings of transformers 32–34 can be connected with additional calibrating and adjusting variable resistors.

In accordance with another modification of our invention, the means for regulating the sensitivity of secondary electron multipliers 9–10 may include a grey wedge which is installed between the beam splitter 7 and the deflecting mirror 11 and whose position and absorbency are variable as a function of the intensity of signals produced by the cell 14. The result will be the same, i.e., the density of the print will correspond to density of the central portion of the negative and the automatic selection of color balance will be a function of the tonal distribution of a substantially larger portion of the negative.

Without further analysis, the foregoing will so fully reveal the gist of the present invention that others can, by applying current knowledge, readily adapt it for vari-

What is claimed as new and desired to be protected by Letters Patent is set forth in the appended claims:

1. Apparatus for color printing of images of negatives on multiple sensitized photographic material, comprising means for directing a composite light beam containing a plurality of light components of different wave length through a negative and for focussing the beam on photographic material to form a projected image thereon; first reading means for reading a first light sample which has passed through a relatively small first portion of the negative to determine the density of such portion; first control means for controlling the density of the print on photographic material as a function of the thus determined density; second reading means for reading a second light sample which has passed through a relatively large second portion of the negative to determine the tonal distribution of said second portion; and second control means for controlling the color balance of the print as a function of the thus determined tonal distribution.

2. Apparatus as defined in claim 1, wherein said first portion is the central portion of the negative.

3. Apparatus as defined in claim 2, wherein said second portion includes all but said first portion of the negative.

4. Apparatus as defined in claim 1, wherein said second portion includes the entire negative.

5. Apparatus as defined in claim 1, wherein said second reading means comprises photoelectric means and wherein said first control means includes means for varying the intensity of said photoelectric means.

6. Apparatus for color printing of images on multiple sensitized photographic material, comprising sources of light components of different wave length; objective means for focussing the composite light beam containing said light components on photographic material after passage of such components through a negative so that the beam forms a projected image on the photographic material; first deflecting means for deflecting from said composite beam a first sample beam which has passed through a relatively small first portion of the negative; first photoelectric reading means located in the path of said first sample beam to determine the density of said first portion and to produce signals whose intensity is a function of such density; second deflecting means arranged to deflect from said composite beam a second sample beam after the second sample beam has passed through a relatively large second portion of the negative; means for splitting the second sample beam into said light components of different wave length; a plurality of second photoelectric reading means each located in the path of one of said split components and arranged to control said sources to select the color balance of the print in accordance with the tonal distribution of said second portion of the negative; and means for regulating the sensitivity of said plurality of photoelectric reading means as a function of the intensity of said signals.

7. Apparatus as defined in claim 6, wherein said first deflecting means is located in said second sample beam.

8. Apparatus as defined in claim 7, further comprising a pair of condenser lenses disposed in the path of said second sample beam at the opposite sides of said first deflecting means.

9. Apparatus as defined in claim 6, wherein said regulating means forms part of an electric circuit including a plurality of resistors, said first reading means being connected with said plurality of resistors.

10. Apparatus as defined in claim 9, wherein said circuit further comprises transformer means having primary winding means connected with said resistors and secondary winding means connected with said second reading means.

11. Apparatus as defined in claim 10, wherein each of said second reading means comprises a secondary electron multiplier.

12. Apparatus as defined in claim 10, wherein said circuit further includes a bridge rectifier connected with said primary winding means and having a direct-current branch, said plurality of resistors including a transistor having an emitter-collector circuit connected with said direct-current branch, and amplifier means connecting the base of said transistor with said first reading means.

13. Apparatus as defined in claim 12, wherein said circuit further comprises a source of electrical energy and said first reading means is connected between said energy source and said amplifier means.

14. Apparatus as defined in claim 13, wherein said amplifier means comprises a second transistor whose base is connected with said first reading means.

15. Apparatus as defined in claim 14, wherein another of said plurality of resistors is connected in series with said first reading means and wherein the base of said second transistor is connected to a tap between said first reading means and said other resistor.

16. Apparatus as defined in claim 6, further comprising timer means connecting said second reading means with the respective sources.

17. Apparatus as defined in claim 16, wherein said timer means controls filters.

18. Apparatus as defined in claim 16, wherein said timer means controls shutters.

19. Apparatus as defined in claim 16, wherein said timer means comprises electromagnets.

20. Apparatus as defined in claim 6, wherein said beam splitting means comprises a dichroic beam splitter.

References Cited

UNITED STATES PATENTS 3,085,469   4/1963   Carlson _____ 355—38 X

NORTON ANSHER, Primary Examiner

R. A. WINTERCORN, Assistant Examiner

U.S. Cl. X.R.

355—35, 38